United States Patent [19]

Porter, Jr. et al.

[11] Patent Number: 4,496,015

[45] Date of Patent: Jan. 29, 1985

[54] INTERCHANGEABLE DRIVE MEANS FOR A VEHICLE

[75] Inventors: James A. Porter, Jr., Houston; Joe D. Shivers, Friendswood; Marek Rozycki, Houston; Otis Johnston, League City, all of Tex.

[73] Assignee: Litton Resources Systems, Inc., Alvin, Tex.

[21] Appl. No.: 412,428

[22] Filed: Aug. 30, 1982

[51] Int. Cl.³ .............................. B60D 7/00; B60P 1/04
[52] U.S. Cl. .................................. 180/9.26; 180/9.21; 180/9.28
[58] Field of Search ................ 180/9.26, 9.21, 9.28; 280/492, 400; 305/15, 16

[56] References Cited

U.S. PATENT DOCUMENTS

| 1,453,782 | 5/1973 | Bell | |
|---|---|---|---|
| 3,113,805 | 12/1963 | Nodwell | 305/15 |
| 3,215,219 | 11/1965 | Forsyth et al. | 280/492 |
| 3,318,403 | 7/1965 | Hansen | 180/5 |
| 3,439,763 | 4/1969 | Pederson | 180/9.24 |
| 3,717,217 | 2/1973 | Muecke et al. | 181/0.5 VM |
| 3,815,817 | 6/1974 | Bamford | 238/10 R |
| 3,905,446 | 9/1975 | Ross | 181/114 |
| 4,253,536 | 3/1981 | Broathen | 280/492 |

Primary Examiner—Joseph F. Peters, Jr.
Assistant Examiner—Donn McGiehein
Attorney, Agent, or Firm—William A. Knox

[57] ABSTRACT

A cross country vehicle for seismic exploration is provided wherein a first drive means, such as wheels can be conveniently interchanged, in the field, for a second drive means having a different configuration such as endless tracks. The interchange is enabled by use of a pre-existing lifting means associated with a seismic acoustic source.

3 Claims, 11 Drawing Figures

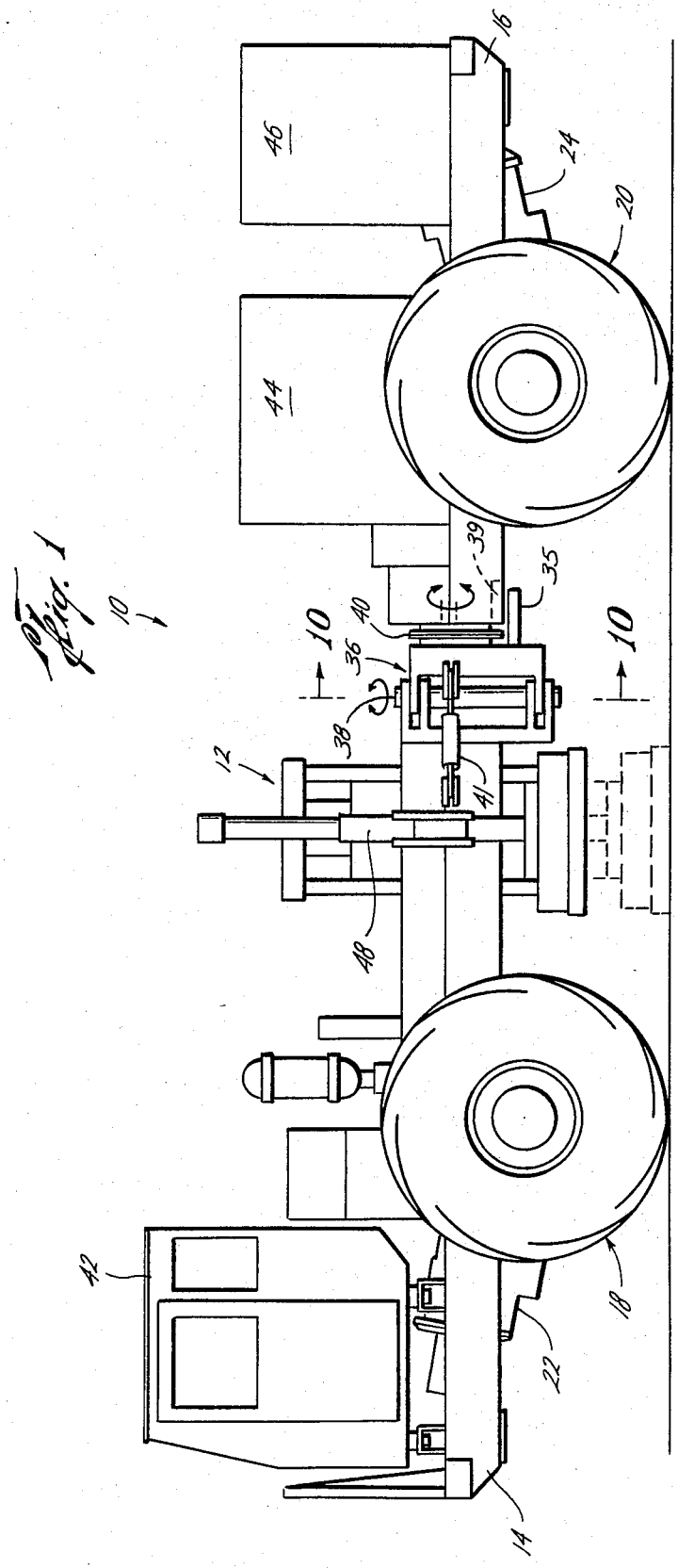

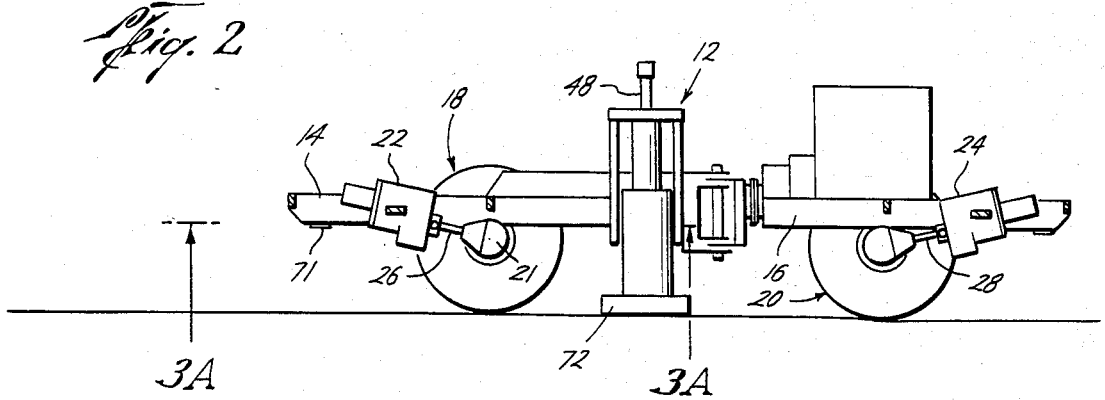
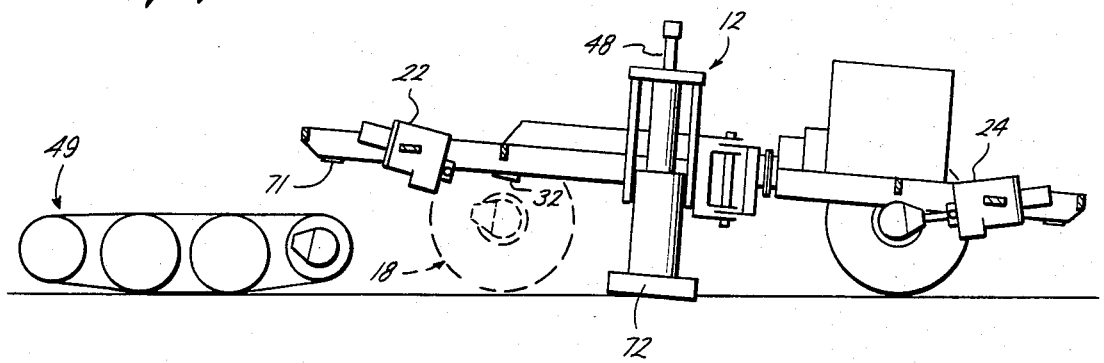
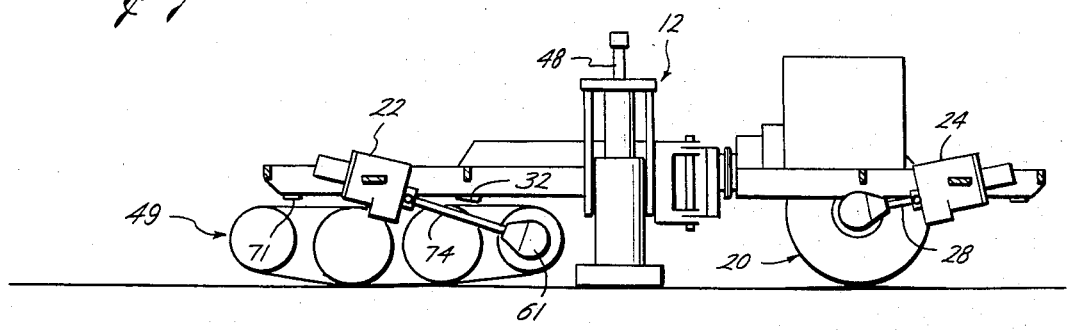

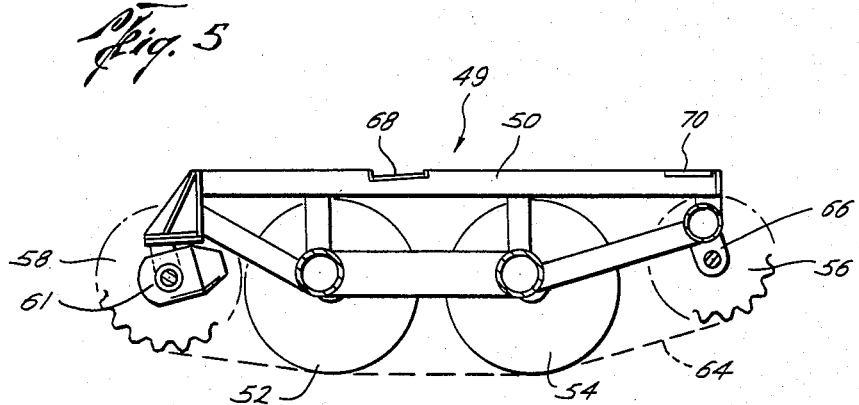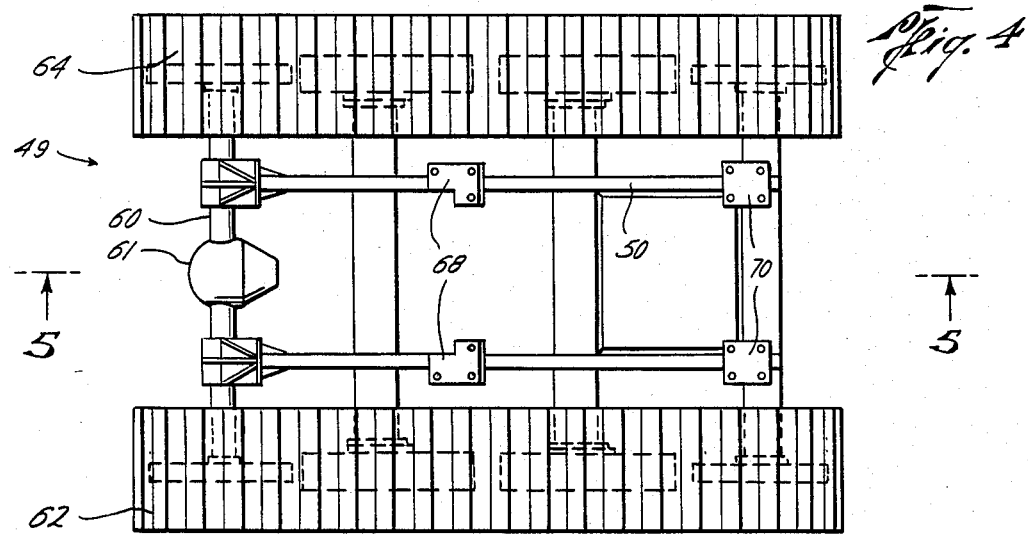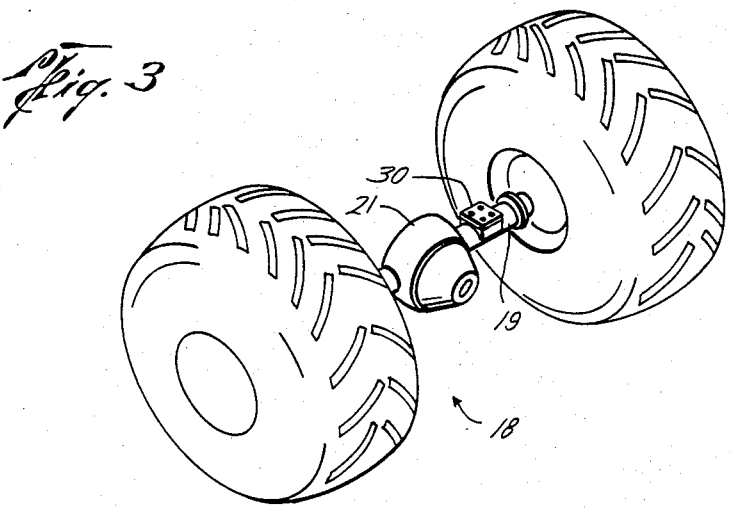

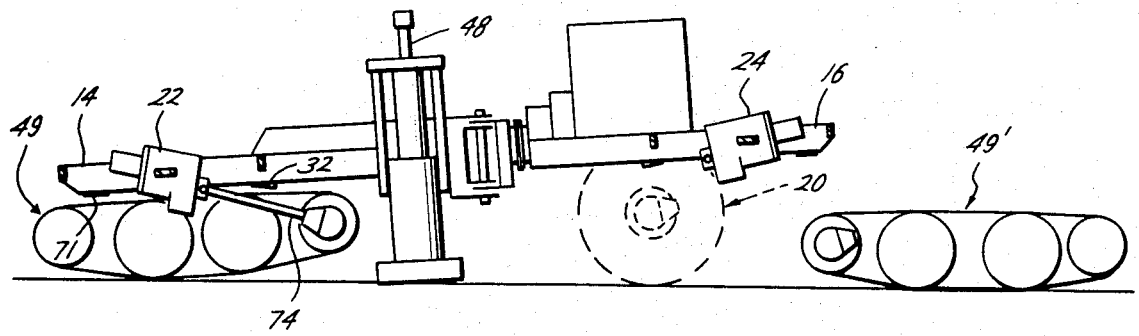
Fig. 8
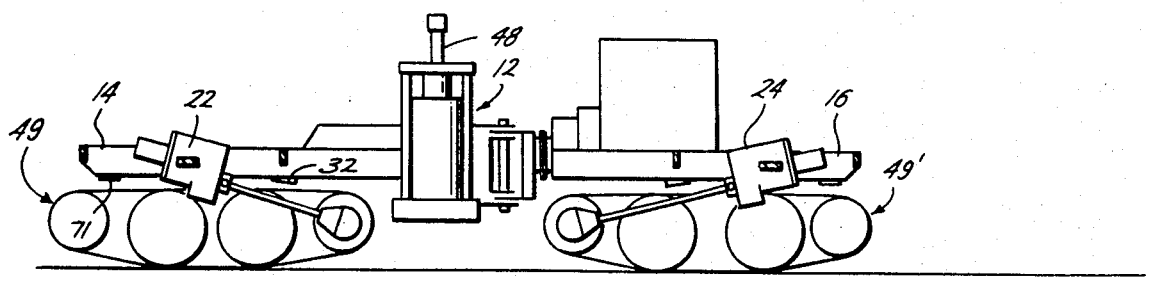
Fig. 9
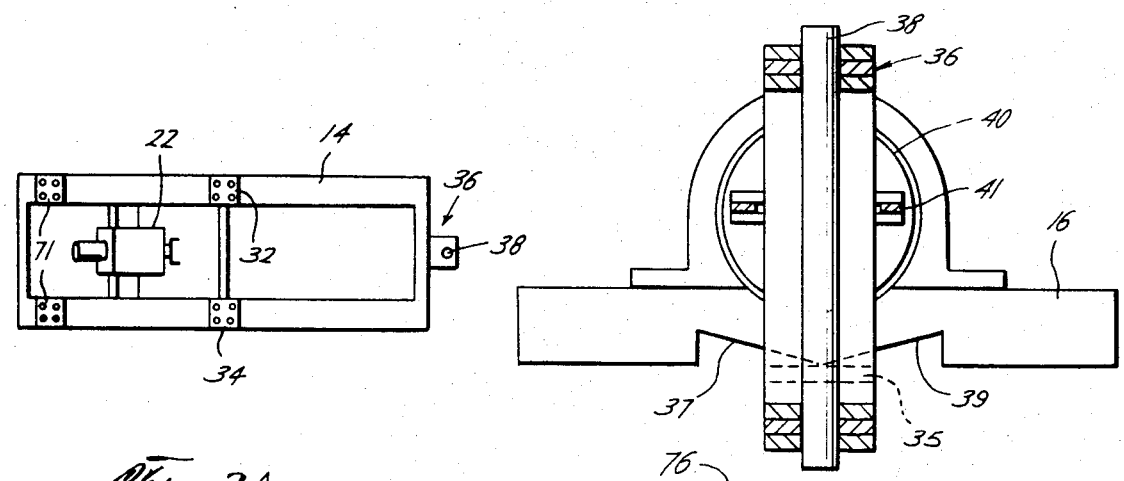
Fig. 3A
Fig. 10

INTERCHANGEABLE DRIVE MEANS FOR A VEHICLE

BACKGROUND OF THE INVENTION

1. Field of the Invention

This invention is concerned with ground-contacting drive means of different types as used with off-road vehicles in seismic exploration.

2. Background of the Invention

A large amount of seismic exploration is conducted off-road in hostile terrain. For such operations, specialized vehicles have been developed for heavy duty service in connection with recording-instrument units, bore-hole drilling rigs and seismic vibrators.

Depending upon the service, some vehicles are equipped with oversized wheels using tire sizes such as 66×44 or larger. Such large tires provide minimal ground loading, good traction over ice, a certain amount of floatation in swampy regions, yet provide acceptable road speed when moving from one operational base to another. Usually each pair of wheels, front and rear, are driven independently by individual hydrostatic drive motors. Generally the vehicles are articulated. That is, the vehicle consists of a front and a rear bed frame that are joined by a suitable swivel joint. The unit is steered by hydraulic rams that bend the bed frames relative to each other about a vertical axis. In that arrangement, the wheels and wheel transaxles are not themselves steerable but are fixedly secured to their respective bed frames. See for example, U.S. Pat. No. 3,905,446.

Wheels, even oversized, are not always suitable for some operational areas. In deep snow in the northern reaches of Alaska and Canada, and in some very sandy desert areas, track drive means are preferred. Although track drives are much heavier than wheels, the large track area substantially reduces the vehicle loading per unit area.

Known tracked vehicles employed in seismic exploration are designed solely for use with tracks. See for example, U.S. Pat. No. 3,717,217. Many of the heavier units employ an all-track configuration, much like conventional crawler-type tractors. Steering is accomplished by differential braking of one track with respect to the other. That type of steering is known to the trade as "skid steering". Skid steering has disadvantages. In climbing a slope where a turn is required, the stalled track looses traction such that oft-times the vehicle cannot negotiate the slope. Further, when the vehicle pivots about the braked track, the ground beneath, is severely disturbed, something that must be avoided in fragile environments.

Other types of units may be articulated as with the earlier mentioned wheeled vehicles, with each bed frame having its own set of tracks. The two sets of tracks are driven by a central engine through driveshafts having U-joint coupling at the point of articulation.

An articulated track unit is generally about six to eight tons heavier than an equivalent wheeled vehicle. Such units are very slow when driven over haul-roads from one site of operations to another. However, they do not tend to stall on slopes and they are kind to fragile terrain.

In one area of operations along the North Slope of Alaska, seismic lines of survey extend from land, offshore into the Beaufort Sea. On land, tracked vehicles are used. When venturing onto the sea ice in winter, wheeled vehicles are preferred over tracked vehicles because they are lighter in overall weight and can operate faster. For such Arctic operations, two sets of certain types of the vehicles such as vibrators must be maintained, one set having wheels, the other set having tracks. That need results in substantially increased capital costs. Therefore, it would be most useful to provide a heavy-duty off-road vehicle that can be quickly and easily converted in the field from wheels to tracks and vice versa.

Conversion kits are known, of course, particularly for use with tandem rear drive-wheels of a conventional truck, where an endless track is wrapped around each tandem pair of the rear wheels. The truck is in effect converted to a half-track of military fame. The truck is then steered by conventional means, the front wheels either being left intact or equipped with skis. Similar conversion kits are available for use in converting motor bikes into snow scooters. For that conversion, the rear wheel of the bike is removed and is replaced by a track assembly. Typical of such patents are U.S. Pat. Nos. 1,453,782; 3,381,403 and 3,439,763.

Considering the physical size of the 66×44 tires used on seismic vehicles, a track assembly large enough to enwrap both pairs of drive wheels would be too cumbersome to be practical.

Another type of drive-means conversion which, although not necessarily suitable to this application but which is mentioned for completeness, is the conversion of road vehicles for use on rails. Small rail wheels bolted under the chassis of a road vehicle, are lowered to engage the pair of rails. The rear tires of the road vehicle then drive the rear rail wheels by frictional contact therewith to propel the vehicle as desired.

SUMMARY OF THE INVENTION

It is an object of this invention to provide an off-road vehicle whose drive means are readily interchangeable, in the field, with some other type of drive means.

In a preferred embodiment of this invention, an articulated vehicle includes two pivotally-interconnected chassis. Each chassis includes its own independently powered drive means, the two drive means being substantially similar in configuration. Means are provided to enable a complete interchange of one pair of independently powered drive means having a first configuration for another pair of independently powered drive means having a second, different configuration.

In accordance with an aspect of this invention, the vehicle has disposed thereon a self-contained lifting means near the center of gravity thereof, as determined when two drive means of the same configuration are installed under the vehicle. To interchange a first pair of drive means having a first configuration for second pair having a different configuration, one drive means of the first pair is disconnected from a first of the two chassis. The lifting means is actuated to raise that chassis clear of the disconnected drive means. That drive means is then replaced by one of a second pair of drive means having a second configuration. The first of the two chassis is lowered and the second drive means is connected thereto. The above steps are repeated for the second of the two chassis and the other of the first pair of drive means is replaced by the other of the second pair of drive means.

In accordance with an aspect of this invention the drive interchange enabling means may be a pre-existing lifting means associated with a seismic acoustic source.

BRIEF DESCRIPTION OF THE DRAWINGS

The benefits and objects of this invention will be better understood by reference to the accompanying detailed description and the drawings wherein:

FIG. 1 is an overall view of a conventional articulated vehicle as used in seismic exploration;

FIG. 2 is a schematic, skeletonized view of the vehicle showing the essential details of the configuration of the drive trains and supports;

FIG. 3 is a perspective view of a pair of wheels interconnected by a transaxle;

FIG. 3A is a view of the underside of the front bed frame of the articulated vehicle;

FIG. 4 is a plan view of a tracked undercarriage;

FIG. 5 is a sectional view of the tracked undercarriage along section 5—5;

FIGS. 6–9 illustrate the steps used in interchanging a drive means having a first configuration for a drive means having a different configuration;

FIG. 10 is a partial view along line 10—10 of the swivel that interconnects the front and rear bed frames of FIG. 1.

DETAILED DESCRIPTION OF THE INVENTION

Referring now to FIG. 1, there is shown an articulated vehicle 10, which by way of example, may be a carrier for a seismic sound source such as a vibrator shown generally as 12. The vehicle consists of two bed frames 14 and 16, front and rear. Each bed frame is supported by a drive means 18 and 20 such as a pair of operatively interconnected wheels as shown in FIGS. 1, 2 and 3 by way of example. Each pair of wheels, interconnected by a transaxle 19 and a conventional differential 21, is independently powered by its own hydraulic motor and transmission 22 and 24. Each motor and transmission assembly is permanently mounted in the respective bed frames. The motor output shafts are coupled to the respective differentials by detachable drive shafts 26 and 28. Mounting pads 30, cast as a portion of each end of each transaxle housing, fit into mating mounting plates 32 and 34 on the underside of front bed frame 14 (FIG. 3a) and are bolted thereto. Rear bed frame 16, of course, has identical mounting plates on its underside except that the disposition of the mounting plates is reversed. The mounting plates are slightly slanted so that the motor output shafts are aligned with the differential input shafts. Additional second mounting plates 71 are also provided for use when a tracked undercarriage is to be used as will be later described.

It should be understood that the wheels and transaxles are conventional and can be purchased off-the-shelf from Franklin Equipment Co. of Franklin, VA 23851. The wheels and axles are heavy-duty units and find their principal use with logging trucks.

The two bed frames 14 and 16 are pivotally interconnected by a two-axis swivel 36. See FIGS. 1 and 10. The bed frames may rotate with respect to each other about a vertical axial bearing 38 and a longitudinal axial bearing 40. Rotation about the longitudinal axis is limited by stops 37 and 39 in combination with a lug 35 to about 15 degrees. About the vertical axis, rotation is limited by the stroke of the hydraulic steering rams such as 41, the second steering ram on the other side being hidden.

An operator's cab 42 is located at the extreme forward end of the front bed frame 14. The rear bed frame 16 carries a prime mover such as a Diesel engine 44 and hydraulic pumps 46 that provide the hydraulic power that is necessary to drive and steer the vehicle as well as to operate the seismic acoustic source 12.

The seismic acoustic source is mounted behind the cab 42, just in front of the swivel 36. Hydraulic jacks such as 48 raise the acoustic source above the ground for transport between survey stations. On-station and in operation, the acoustic source is pressed against the ground, as shown by the dashed lines, by the hydraulic jacks 48 until the front wheels of the vehicle rise above the ground a desired amount. That procedure is required in order to couple the acoustic source to the ground under the static mass of a portion of the vehicle. Because customarily, the front bed frame rather than the rear bed frame is raised off the ground, the seismic acoustic source assembly must be located just ahead of the swivel 36. The equipment load carried by the vehicle is distributed so that the rear bed frame is a little bit heavier than the front bed frame. The acoustic source 12 is therefore mounted near, but ahead of, the center of gravity of the vehicle, assuming of course that the front and rear drive means have substantially the same configuration. The term "near" means a distance less than the width of the bed frames.

A tracked undercarriage 49 suitable for use with the subject vehicle, as will be discussed later, is shown in FIGS. 4 and 5. See also, U.S. Pat. No. 3,717,217. It consists of a framework 50 that supports two pairs of bogie wheels 52, 54 (only one of each pair is shown in FIG. 5) having tire sizes such as 7.24×20, a pair of idler sprockets 56 at one end of the framework 50, and a pair of drive sprockets 58 at the other end. See U.S. Pat. No. 3,113,805 for a description of such sprockets. The drive sprockets are operatively coupled together by means of a Franklin transaxle. Endless tracks 62 and 64 are wrapped around the sprockets and bogies as well known to the art. One type of track is disclosed in U.S. Pat. No. 3,815,817. It should be understood that the idler sprocket 56 and bogies 52 and 54 are supported from the framework by eccentric cranks such as 66, to provide a resilient suspension. The entire tracked undercarriage can be bought as a complete unit from Canadian Foremost Ltd. of Calgary, Alberta, Canada. The undercarriage may be independently driven by its own dedicated motor.

At the top of framework 50, a first mounting socket such as 68 is welded in place and is analogous to the mounting pad 30 as cast into the transaxle housing of the wheeled configuration. The first mounting socket 68 is designed to fit onto the same mounting plates such as 32 beneath the bed frames that formerly received the transaxle pads. A second pair of pads 70 are welded to the other end of the frame 50. The use of these sets of mounting assemblies will be discussed infra.

As stated earlier, it is the purpose of this invention to provide a means for readily enabling conversion, of a vehicle from wheels, that is, a drive means having a first configuration, to tracks, a drive means having a second, different configuration and vice versa.

The procedure will now be explained with the aid of FIGS. 2 and 6–9, which schematically show merely the essential operations of interchanging a drive means having a first configuration for a drive means having a second configuration and the means for enabling the interchange.

With the vehicle in level position and the wheels resting on the ground, FIG. 2, the eight bolts that secure the mounting pads such as 30 of the wheeled transaxle housing 19 to the mounting plates 32 and 34 of the front bed frame 14 are removed. Drive shaft 26 is disconnected from the differential input shaft and the motor output shaft. The hydraulic jacks 48 that manipulate the acoustic source are actuated to press the bed plate of the source against the ground, raising the front bed frame as shown in FIG. 6, clear of the wheels.

It should be noted that the bed plate 72 of the acoustic sound source stabilizes the front bed frame. The remaining wheels 20 under the rear bed frame 16 stabilize the rear end of the vehicle. Hence there is no tendency for the two bed frames to become unstable about the longitudinal axis. At the same time, the two steering rams (not shown in FIG. 6) are locked to stablize the vehicle about the vertical axis.

After the front bed frame 14 clears the wheels 18, the wheels are simply rolled out of the way. A tracked undercarriage 49 is rolled under front bed frame 14 where the first pair of mounting sockets 68 on the undercarriage frame (FIGS. 4 and 5) are aligned with the two mounting plates 32 and 34 (FIG. 3A) on the underside of the front bed frame 14. The front end of the vehicle is lowered to rest on the frame of the tracked undercarriage 49 (FIG. 7) and is bolted thereto at the first and second mounting pads 68 and 70. Drive shaft 74 is then reconnected to the sprocket differential 61 of the undercarriage and to the drive motor 22.

The rear wheels 20 are unbolted from the rear bed frame 16 and drive shaft 28 is removed. The acoustic source lifting jacks are again actuated as shown in FIG. 8. The excess weight of the front undercarriage 49 upsets the load distribution borne by the vehicle. Therefore, when the lifting means 48 are actuated to enable the interchange of the rear wheels 20 for a tracked undercarriage 49', it is the rear bed frame 16 that is now necessarily raised clear of the wheels. The rear wheels 20 are rolled out of the way and are replaced by the rear tracked undercarriage 49' which is attached to the rear bed frame after it has been lowered (FIG. 9) as previously described for the front end.

When the rear end of the vehicle is raised, there is no stable support for the rear bed frame about the longitudinal vehicle axis. Therefore, before raising the rear end, steel wedges 76 and 78 are inserted between the swivel lug 35 and the longitudinal-axis stops 37 and 39 on the underside of the front of the rear bed frame (FIGS. 1 and 10). The wedges are of course removed after the drive-means interchange has been completed.

Reconversion back to wheels is done by reversing the procedure above described.

This invention has been described with reference to an exemplary articulated vehicle having a retractable seismic acoustic sound source, such as a vibrator, mounted near its center of gravity. Other types of vehicles that include some sort of self-contained lifting means are included within the scope of this disclosure. For example, the pull-down mechanism of a shot-hole drilling rig could be employed as a means to enable replacement of one drive means for another. In the absence of a suitable pre-installed lifting means inherently associated with ancillary equipment as previously described, a special set of hydraulic jacks may be installed near the center of gravity of the vehicle. All such devices fall within the scope and spirit of this invention which is limited only by the appended claims.

In this exemplary disclosure, the drive-interchange enabling means is located near, but just ahead of the center of gravity of the vehicle. The enabling means could just as well be mounted near but behind the vehicle center of gravity if the arrangement of the load borne by the vehicle so demanded.

We claim as our invention:

1. An articulated vehicle for cross country seismic exploration comprising:
   a front bed frame and a rear bed frame pivotally coupled relative to each other about a vertical axis and a longitudinal axis;
   first pair of drive means having a first configuration disposed so as to support each said bed frame, each said drive means being capable of receiving motive power from separate and independent power sources,
   a self-contained means for enabling the replacement of said first drive means having a first configuration by second drive means having a second different configuration, under said front bed frame, said second drive means being capable of receiving motive power from a first independent power source; and
   a detachable means for inhibiting relative rotation of said bed frame about said longitudinal axis when said enabling means is operative to enable the replacement of said first drive means having a first configuration by a second drive means having a second configuration beneath said rear bed frame, said second drive means being capable of receiving motive power from a second independent power source.

2. The articulated vehicle as defined by claim 1 wherein said replacement enabling means comprises a pre-existing hydrostatic lifting means, associated with a seismic acoustic source, mounted on said vehicle at the approximate center of gravity of said vehicle as defined when two drive means having the same configuration support the respective bed frames.

3. The articulated vehicle as defined by claim 2 wherein the drive means having a first configuration includes a pair of wheels operatively interconnected by a transaxle, and the drive means having a second configuration includes a crawler-track-type undercarriage.

* * * * *